W. J. WARRINGTON.
DRIER.
APPLICATION FILED NOV. 3, 1919.
1,377,644.
Patented May 10, 1921.
4 SHEETS—SHEET 3.
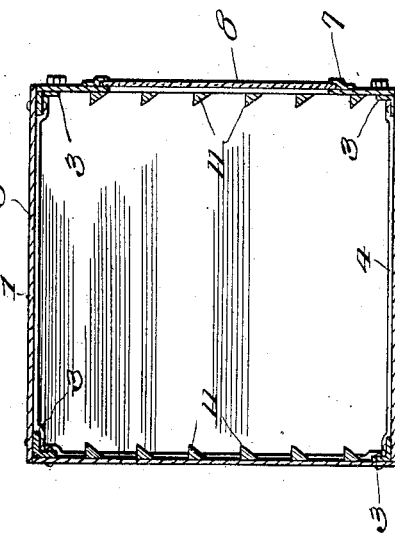
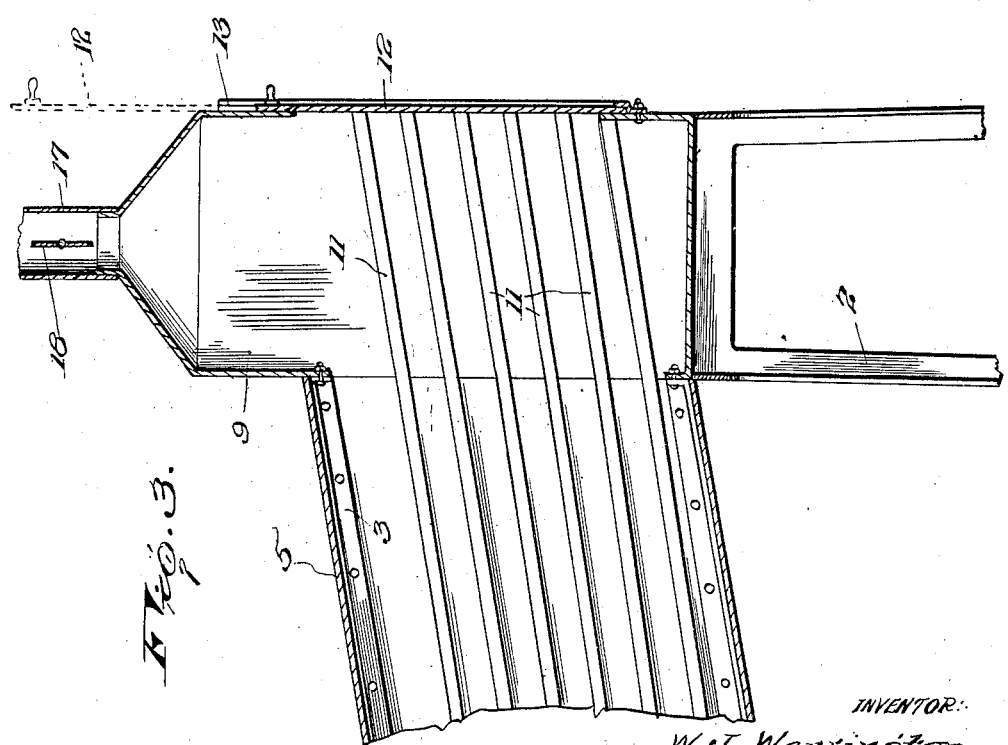
INVENTOR:
W. J. Warrington.

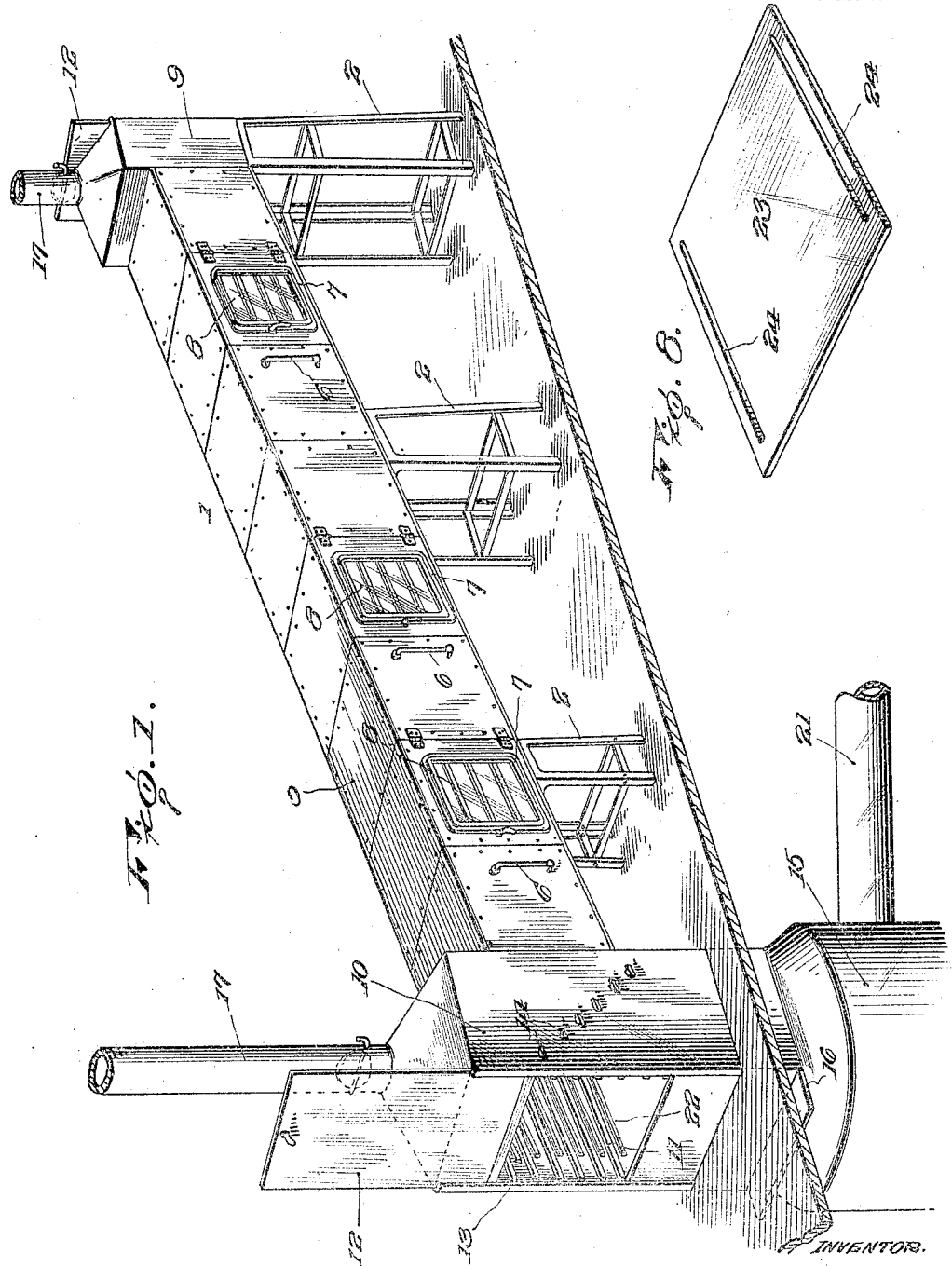

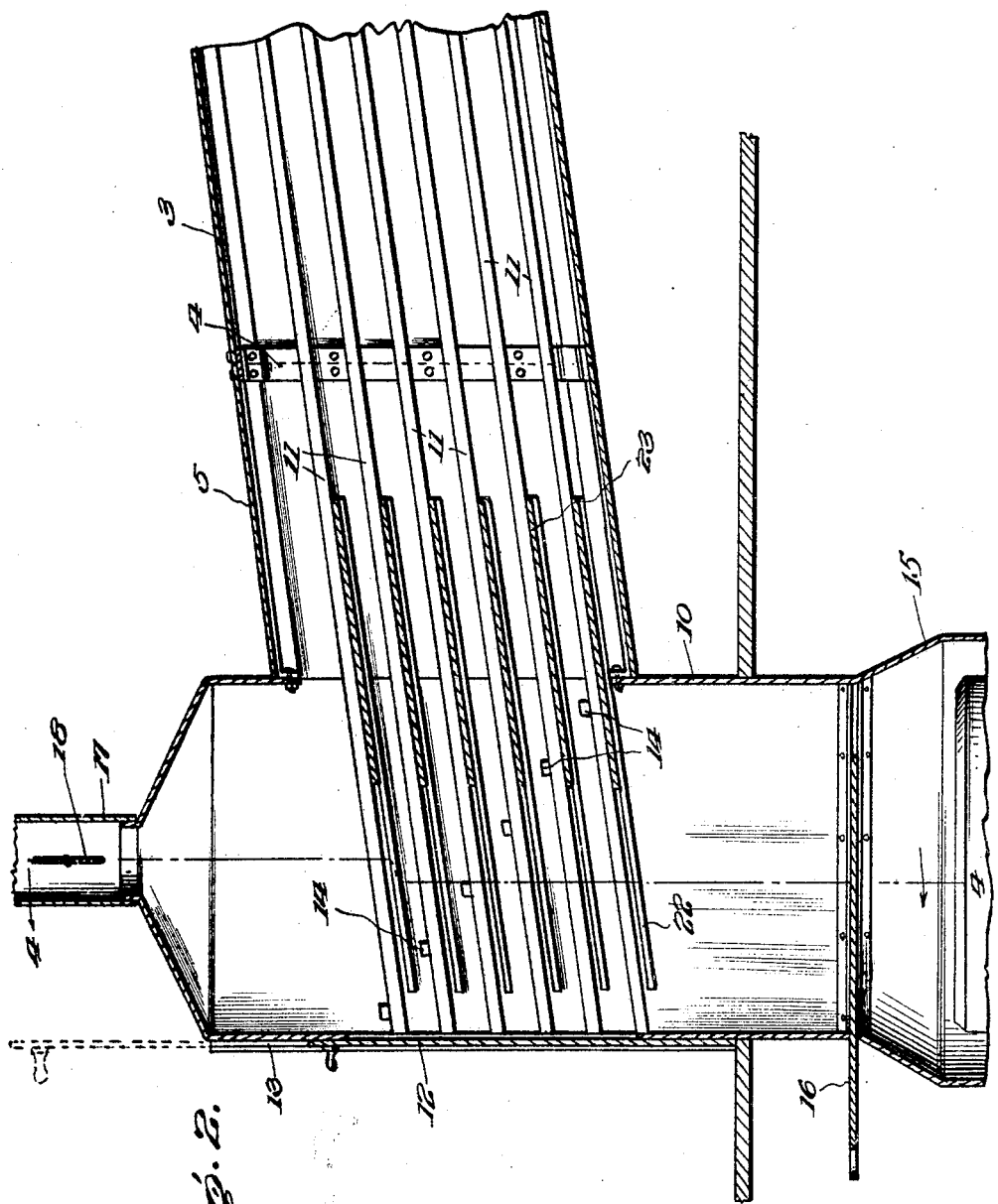

W. J. WARRINGTON.
DRIER.
APPLICATION FILED NOV. 3, 1919.
1,377,644.
Patented May 10, 1921.
4 SHEETS—SHEET 4.
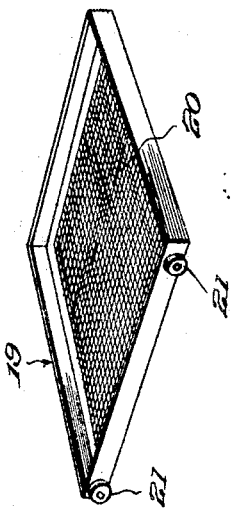
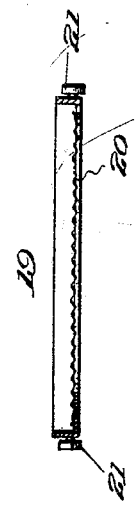
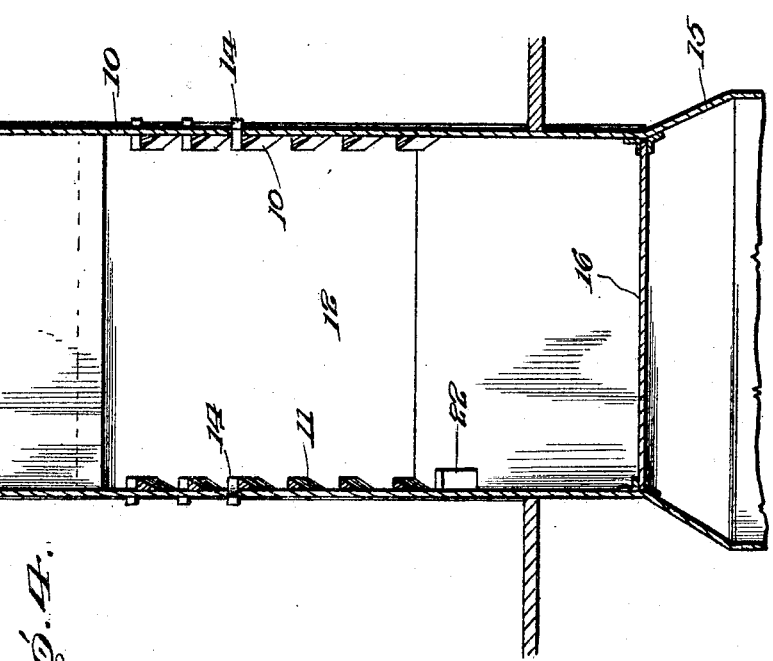
INVENTOR:
W. J. Warrington.

UNITED STATES PATENT OFFICE.

WILLIAM J. WARRINGTON, OF NEW ORLEANS, LOUISIANA, ASSIGNOR, BY DIRECT AND MESNE ASSIGNMENTS, OF TWO-NINTHS TO L. EARL TONGLET, TWO-NINTHS TO EDMOND J. McGINNIS, AND TWO-NINTHS TO CHARLES G. GASPARD, ALL OF NEW ORLEANS, LOUISIANA.

DRIER.

1,377,644.      Specification of Letters Patent.      Patented May 10, 1921.

Application filed November 3, 1919. Serial No. 335,242.

*To all whom it may concern:*

Be it known that I, WILLIAM J. WARRINGTON, a citizen of the United States, residing at New Orleans, in the parish of Orleans, and State of Louisiana, have invented certain new and useful Improvements in Driers, of which the following is a specification.

The object of this invention is to provide means whereby food will be preserved by having moisture extracted therefrom. The invention is intended primarily for drying shrimp, fish, or other fresh and salt water food but may be employed without substantial change for drying meats, fruits, or other forms of food. The invention seeks to provide means whereby the food to be treated may move in a path traversed by a heating or moisture-extracting agent and in opposition to the travel of said agent, and incidental objects of the invention are to provide means whereby the pasage of the food along the said path may be noted as well as the condition of the food at various stages. Other incidental objects of the invention will appear in the course of the following description.

The invention is illustrated in the accompanying drawings, in which—

Figure 1 is a perspective view of an apparatus embodying the invention;

Fig. 2 is an enlarged longitudinal section of one end of the apparatus;

Fig. 3 is an enlarged longitudinal section of the opposite end of the apparatus;

Fig. 4 is a section on the line 4—4 of Fig. 2;

Fig. 5 is a transverse section of the conduit through which the food and the moisture-extracting agent travel;

Fig. 6 is a perspective view of a tray which may be employed to support the food in its travel through the conduit;

Fig. 7 is a vertical section of the tray;

Fig. 8 is a detail perspective view of a deflecting plate.

In carrying out my invention, I employ a conduit 1 which may be of any desired dimensions and is supported by standards or frames 2 so that it will be higher at one end than at the opposite end, the inclination being such as may be deemed most advantageous for the particular food to be normally treated. This conduit may be of any convenient construction and is illustrated as composed of longitudinally disposed angle bars 3 connected and braced at intervals by frames 4, a covering or wall 5 of any preferred material being secured upon the frame and the bars as will be readily understood. The bars or frames 4 will divide the conduit theoretically into a plurality of compartments, sections or chambers and upon the outer walls of some of the compartments will be mounted thermometers 6 whereby the temperature of the several compartments or different points of the conduit may be noted at all times. Preferably alternating with the thermometers, I provide, in the side wall of the conduit, doors 7 through which access may be had to the interior of the conduit and these doors are shown as fitted with panels 8 of transparent material so that the condition of the food may be noted without opening the doors and thereby chilling the conduit. It is, of course, obvious that some of the food may dry more quickly than other portions thereof and may be in condition to be removed before having traversed the entire length of the conduit. Such food may be removed through the side doors 7, and it will be understood that the transparent panels 8 may be omitted if desired.

The ends of the conduit open into an upper chamber 9 and a lower heating chamber 10, respectively, and longitudinal rails 11 extend through the conduit and into the chambers 9 and 10 so as to support trays containing the food in an obvious manner. The rails are parallel with the top and bottom of the conduit and should be spaced apart sufficiently to permit circulation of the moisture-extracting agent over and below the several trays. The chambers 9 and 10 are provided in their outer sides with removable doors or closures 12 to facilitate the insertion and removal of the trays and these doors are preferably flat plates of sheet metal slidably fitted in ways or grooves 13 at the edges of the outer side walls of the compartments. In the end walls of the lower compartment or chamber 10, I fit keys or stops 14 which project through the said walls and rest upon the rails 11 so as to limit the downward movement of the trays. These stops are arranged in stepped relation, as clearly shown in Figs. 1 and 2, so that the trays engaging the stops will be likewise arranged in stepped relation and the heated or dry air or other moisture-extracting agent will have access to the trays upon all of the rails. The keys or pins may be of any preferred construction and may conveniently be T-shaped blocks, the stems of the T's being inserted through the walls of the heating chamber and the heads of the T's constituting stops to limit the insertion of the pins and also serving as handles by which the T's may be inserted or withdrawn.

The upper heating chamber 9 rests upon and is supported by a standard or frame 2 while the lower chamber 10, in the illustrated arrangement, communicates directly with a furnace 15 but any other heat-generating mechanism may be utilized. A damper or cut-off 16 is slidably fitted in the lower end of the chamber 10 and serves to control the communication between the heater and said chamber. A flue or escape pipe 17 extends from the top of each chamber 9 and 10 and in the lower portion of the escape pipe or flue is mounted a damper or valve 18 by which the flow through the said pipe may be shut off or controlled.

The food to be dried will preferably be placed in trays, one of which is shown in detail in Figs. 6 and 7. Each tray 18 will consist of a rim or side and end walls and a bottom which, as shown at 19, will preferably be foraminous so that the moisture-extracting agent can readily reach and circulate through the food. The trays may, however, have solid bottoms and the side walls of the trays may rest directly upon and slide on the rails, but to facilitate the travel of the trays and reduce wear I will preferably provide rollers 20 on the sides of the trays to run upon the rails.

In the drawings I have indicated a furnace as the heat-supplying member. When a furnace is employed, the smoke and other noxious products of combustion will be carried off through the smoke flue 21 and the air employed in the drier will not pass through the firebox but will circulate through a heating chamber surrounding the fire box. By adjusting the dampers 18 the temperature in the conduit and the escape of the used air may be controlled. The trays containing the food are placed upon the rails 11 in the upper chamber 9 and will roll along the rails to and into the lower compartment 10. As the hot air travels to the chamber 9 it will absorb moisture from the food and this moisture-laden air will escape through the flue 17 from said upper chamber without remaining in the chamber and stagnating to prevent the proper evaporation of moisture from the food. It will be readily understood that the air rising from the furnace and passing into the lower chamber 10 will be dry, sterilized or superheated and, consequently, will very effectually extract moisture which may be in the products on the trays. As the air flows toward and into the upper chamber 9 it will gradually become moisture laden, but this moisture-laden air will be in contact with the food more recently placed within the apparatus and will be capable of extracting some moisture therefrom. As the food-laden trays travel in the opposite direction through the conduit, the moisture will be extracted gradually so that the formation of dense volumes of steam or vapor by contact of the hottest air with the most recently inserted food will be avoided and the moisture will be extracted in a manner which will be most beneficial to the food. The trays containing the dried food will, of course, be partly or wholly within the lower chamber 10 and will be withdrawn therefrom through the outer side thereof while the door 12 is raised.

In the lower heating chamber 10 and in the lower end of the conduit, on the side walls of the same below the several tracks, I secure the longitudinal cleats 22 upon which rest deflectors 23. These deflectors are imperforate plates provided with longitudinal slots 24 through which screws or other fastenings may be inserted into the cleats to retain the deflectors in place and permit them to be adjusted. When the deflectors are moved forward or downward, they will extend more or less across the chamber 10 and, consequently, regulate the currents of hot air and thereby control the quantity of heat passing into the conduit. The apparatus can thus be adapted to any working conditions or the nature of the products to be treated.

The apparatus illustrated is a very simple and inexpensive arrangement for the practice of my invention, but I do not limit myself to the particular structure herein shown and described, as various means may be employed and while I have shown and described the moisture-extracting agent as hot air passing directly from a furnace I contemplate the use of other moisture-extracting agents so that heated or dried air emanating from any source other than the sun may be used. Various minor changes in the details of the construction and arrangement of parts may be made without departing from the invention as the same is defined in the following claims.

While the invention is intended more particularly for dehydrating food products, it is applicable to the drying of clothes or other articles from which it is desired to remove moisture.

Having thus described the invention, what is claimed as new is:

1. An apparatus for the purpose set forth comprising an inclined conduit, a discharge chamber at the lower end of the conduit, a receiving chamber at the upper end of the conduit, means for conveying food to be dried from the receiving chamber through the conduit into the discharge chamber, means for supplying a moisture-extracting agent to the discharge chamber, and means in the top of the discharge chamber and in the top of the receiving chamber to control the flow of said agent and permit it to escape direct from the discharge chamber or to flow through the conduit from said chamber to the receiving chamber.

2. An apparatus for the purpose set forth comprising an inclined conduit, a receiving chamber at the upper end of said conduit, a discharge chamber at the lower end of the conduit, tracks extending longitudinally through the conduit, trays adapted to travel on said tracks, and stops fitted in the end walls of the discharge chamber and extending over the tracks to maintain the trays in stepped relation.

3. An apparatus for the purpose set forth comprising an inclined conduit, a heating chamber in communication with the lower end of the conduit, means for supplying heat to said chamber, and deflectors adjustably mounted in the lower end of the conduit and adapted to extend across the heating chamber.

In testimony whereof I affix my signature.

WM. J. WARRINGTON. [L. S.]